(12) United States Patent  
Nielsen

(10) Patent No.: US 9,901,104 B2
(45) Date of Patent: Feb. 27, 2018

(54) METHOD AND APPARATUS FOR USE IN A FOOD PACKAGING SYSTEM

(71) Applicant: ISHIDA EUROPE LIMITED, Birmingham, West Midlands (GB)

(72) Inventor: Ulrich Carlin Nielsen, Ry (DK)

(73) Assignee: ISHIDA EUROPE LIMITED, Birmingham (GB)

( * ) Notice: Subject to any disclaimer, the term of this patent is extended or adjusted under 35 U.S.C. 154(b) by 583 days.

(21) Appl. No.: 14/395,416

(22) PCT Filed: Apr. 18, 2013

(86) PCT No.: PCT/GB2013/050986
§ 371 (c)(1),
(2) Date: Oct. 17, 2014

(87) PCT Pub. No.: WO2013/156783
PCT Pub. Date: Oct. 24, 2013

(65) Prior Publication Data
US 2015/0081087 A1 Mar. 19, 2015

(30) Foreign Application Priority Data

Apr. 20, 2012 (GB) .................................. 1206983.7

(51) Int. Cl.
*B07C 5/16* (2006.01)
*B65B 1/32* (2006.01)
(Continued)

(52) U.S. Cl.
CPC .......... *A22C 21/00* (2013.01); *A22C 21/0053* (2013.01); *B07C 5/16* (2013.01); *B07C 5/38* (2013.01); *B65G 1/1373* (2013.01)

(58) Field of Classification Search
CPC ........ B65B 1/32; A22C 21/00; A22C 21/0023; B07C 5/16
(Continued)

(56) References Cited

U.S. PATENT DOCUMENTS 4,372,099 A  2/1983 Linville
4,548,286 A * 10/1985 Sashiki ............... G01G 15/001
177/1
(Continued)

FOREIGN PATENT DOCUMENTS

EP          0489984 A1    6/1992
WO     2000023771 A1    4/2000
(Continued)

OTHER PUBLICATIONS

Barbut, Shai, "Poultry Products Processing," CRC Press LLC< 2002, ISBM: 1-58716-060.
Notice of Opposition filed in EP 13718050.1 dated Mar. 31, 2017.

*Primary Examiner* — Gloria R Weeks
(74) *Attorney, Agent, or Firm* — Singularity LLP

(57) ABSTRACT

Apparatus for controlling a poultry packaging system includes a first receiving unit operable to receive a plurality of orders for poultry product, wherein the poultry product is either a whole or a portion of a poultry bird; a second receiving unit operable to receive at least one measurable parameter of at least one poultry bird from a measurement unit; a recommendation unit operable to determine which of the plurality of received orders best corresponds to the received at least one measurable parameter, and a control unit operable transmit a signal to a poultry processing system such that the poultry processing system processes the at least one poultry bird in accordance with the determined order.

14 Claims, 6 Drawing Sheets

(51) Int. Cl.
*A22C 21/00* (2006.01)
*B07C 5/38* (2006.01)
*B65G 1/137* (2006.01)

(58) Field of Classification Search
USPC .................................. 53/502, 493, 155, 53
See application file for complete search history.

(56) References Cited

U.S. PATENT DOCUMENTS

| | | | |
|---|---|---|---|
| 4,627,007 | A | 12/1986 | Muschany |
| 5,406,770 | A * | 4/1995 | Fikacek .................. B65B 5/105 |
| | | | 53/155 |
| 6,533,125 | B1 | 3/2003 | Jensen |
| 6,712,221 | B2 | 3/2004 | Kvisgaard et al. |
| 9,409,664 | B1 * | 8/2016 | Vliet ....................... B65B 59/00 |
| 2003/0065414 | A1 | 4/2003 | Nieuwelaar et al. |
| 2010/0051513 | A1 | 3/2010 | Skyum et al. |
| 2010/0179684 | A1 | 7/2010 | Blaine et al. |
| 2011/0036061 | A1 * | 2/2011 | De Vos ................... B65B 25/04 |
| | | | 53/502 |
| 2011/0105001 | A1 | 5/2011 | Nieuwelaar et al. |
| 2012/0073241 | A1 * | 3/2012 | Mahar ................ G01G 19/4148 |
| | | | 53/55 |

FOREIGN PATENT DOCUMENTS

| | | | |
|---|---|---|---|
| WO | 2000023772 | A1 | 4/2000 |
| WO | 2005095904 | A1 | 10/2005 |

* cited by examiner

METHOD AND APPARATUS FOR USE IN A FOOD PACKAGING SYSTEM

FIELD OF THE INVENTION

The present invention relates to a method for use in a food packaging system in order to optimise the output of food product, in particular reducing giveaway, together with corresponding apparatus and software for performing the method.

BACKGROUND TO INVENTION

A poultry factory will typically comprise a preparation system and a processing system. Whole birds will be delivered to the preparation system and typically slaughtered, de-feathered, de-boned and eviscerated. The prepared birds, or "grillers", are then cut into desired portions and packaged in the processing system. Portions include, among others, breast fillet, legs, drums, thighs and wings.

Poultry is typically packaged in batches, for example, 500 g packs of thighs or 900 g packs of whole legs. The portions from the processing system are firstly fed into an automated weigher that weighs out the desired batches. The weighed batches are then packed by manual operators or automated robotics into containers which are subsequently sealed, labelled and checked before being distributed to the desired outlet, such as a supermarket.

However, in some instances it may not be possible to provide the correct weight batches within a pre-set tolerance. For example, the 900 g batches of whole legs may need to be comprised of four individual legs. If the legs from the particular birds processed in the processing system are mathematically too large or too small to be packaged, then it will be difficult to make up the 900 g required with four legs. This is a particular problem with batches made up of small numbers of individual portions, as variations in portion size have a greater influence on the weight of the batch. Food portions that cannot be made up to a correct batch weight are typically sold off cheaply as "bulk". Alternatively, batches may be sold "overweight", where, for example, a whole "large" chicken may be sold as a "medium" chicken. Another example of batches being sold "overweight" is a 900 g pack containing 1000 g of product, thus "giving away" 100 g to the consumer. Both of these scenarios are inefficient and increase giveaway. Additionally, consumers demand accurate labelling and weights of food product.

What is needed in the art is a means to optimise the output of food product from a food packaging system, in particular minimising giveaway of food product when producing batch sizes.

SUMMARY OF THE INVENTION

In accordance with a first aspect of the present invention, there is provided apparatus for controlling a poultry packaging system, comprising: a first receiving unit operable to receive a plurality of orders for poultry product, wherein said poultry product is either a whole or a portion of a poultry bird, and wherein characteristics of each received order include the weight of the received order and the number of individual poultry bird portions making up the weight of the received order; a second receiving unit operable to receive at least one measurable parameter of at least one poultry bird from a measurement unit; a recommendation unit operable to determine which of the plurality of received orders best corresponds to the received at least one measurable parameter based on the characteristics of each received order and the at least one measurable parameter of the at least one poultry bird, and; a control unit operable to transmit a signal to a poultry processing system such that said poultry processing system processes the at least one poultry bird in accordance with the determined order.

"Orders" in this context refer to requests for poultry product from outlets such as supermarkets and fast food restaurants. For example, a supermarket may order a particular number of units of packs of chicken thighs, or a fast food restaurant may order a particular amount of chicken breast. The orders are typically for batches. For example, a supermarket may order packs of four chicken legs weighing 500 g, or a fast food restaurant may order 5 kgs of chicken breast, with each individual piece in the range of 120-130 g to allow accurate cooking.

The present invention therefore advantageously increases the efficiency of a poultry packaging system, in particular reducing "giveaway". Giveaway in this context refers to poultry that is packaged overweight. The optimisation of the matching of the poultry birds in the food packaging system to the received orders prevents situations where, for example, a "large" chicken has to be packaged with a "medium" label to prevent the large chicken simply being thrown away. The excess chicken in the "medium" pack is thus "given away", reducing the efficiency and cost-effectiveness of the food packaging system. Such a scenario also poses a health risk to the end consumer, as (s)he will typically cook the chicken in accordance with the instructions on the label. If in fact a large chicken has been packaged as a medium chicken, it is likely that the consumer will undercook the bird.

By determining which of the plurality of received orders best corresponds to the received at least one measurable parameter, the received orders are processed using the poultry birds that best match that order, thereby reducing giveaway.

Typically, the control unit is operable to generate as well as transmit the signal to the poultry processing system such that said poultry processing system processes the at least one poultry bird in accordance with the determined order.

Typically, the at least one measurable parameter is from the group including the weight of the poultry bird and the quality of the poultry bird. The weight of the at least one poultry bird is measured by a weigher. This is typically done once the poultry bird has been slaughtered, de-feathered and eviscerated (the bird then known as a "griller"), although the live weight can also be used. The quality of the poultry bird is determined based on characteristics such as the number of blood spots, or any physical abnormalities that may detract from the appearance of the product to the end user. The quality may be determined by manual operators or by automated robotics, for example an infra-red apparatus to detect any blood spots. Additionally, the quality may be determined based on where the chicken was reared (for example free-range or caged) before being sent to the food packaging system.

If a received order is required to be halal, then the poultry birds can also be slaughtered in such a manner, and the at least one measurable parameter determines whether the poultry birds are halal.

In one embodiment, the at least one measurable parameter comprises the weight of the at least one poultry bird, and the second receiving unit is further operable to determine the weight of a portion of the at least one poultry bird utilising the received weight of the poultry bird. The weight of a portion of a poultry bird (such as leg, drum, breast, wing etc.) can be determined accurately and with small variance from bird to bird from known look-up tables. For example, it is well-known to those skilled in the art that two whole wings comprise 11-12% of a whole griller weight, or that two drums comprise 13.5-14.5% of a whole griller weight. Similar percentages exist for each bird portion. Therefore, from just the measured weight of the griller, the weights of each portion can be accurately determined, allowing accurate matching of the poultry birds to the received orders. There are also known weight percentages of a whole poultry bird that can be used if the live weights are measured.

In one embodiment, the at least one measurable parameter comprises the quality of the at least one poultry bird, and the recommendation unit is further operable to determine, based on the measured quality of the poultry bird, whether the poultry bird should be processed in accordance with an order for a whole poultry bird or an order for a portion of a poultry bird. As described hereinabove, orders can be for whole poultry birds (grillers) or portions. Typically, if an end consumer is to buy a whole griller, then (s)he will choose the one with the best perceived overall appearance (for example, no bloodspots or physical abnormalities). Therefore, advantageously, the poultry birds with the highest quality are used to process whole bird orders.

In one embodiment, the recommendation unit determines which of the plurality of received orders best corresponds to the received at least one measurable parameter on an individual griller by griller basis. This provides a high accuracy of order matching. In an alternative embodiment, the second receiving unit is operable to receive the weights of a plurality of poultry birds, and is further operable to: (i) determine an average weight of a poultry bird in a subset of the plurality of poultry birds; and (ii) determine an average weight of a poultry portion in said subset utilising the determined average poultry bird weight of said subset of the plurality of poultry birds; and further wherein the recommendation unit is operable to determine which of the plurality of orders best corresponds to the average weights in steps (i) or (ii).

This advantageously increases the throughput of the chicken processing system, as poultry birds are processed in a subset basis rather than an individual basis. This is particularly useful if the received orders have a relatively large tolerance, for instance orders for packs of four chicken drums with a total weight of 500 g. As long as the total weight of the four drums is 500 g then the individual drum weights are less significant. Therefore, if a subset is found with an average drum weight of 125 g (i.e. a quarter of 500 g), then that subset can be processed to fulfil the order.

On the other hand, if an order requires a small tolerance, for example chicken wings within +/−5 g of a specified weight, then the grillers are analysed on an individual basis. In such a case, grillers with the correct wing size are used for the wing order, and grillers with the "wrong" wing weight can be used to process a different order.

The recommendation unit determines which of the plurality of received orders best corresponds to the at least one measurable parameter based on characteristics of each received order and the at least one measurable parameter of the at least one poultry bird. The characteristics of each received order include the weight of the received order, the number of individual poultry bird portions making up the weight of the received order and may further include a poultry bird portion to be packaged, and/or the deadline for processing the order.

Preferably, the recommendation unit is further operable to rank the plurality of received orders in an order to be processed so as to minimize giveaway of poultry bird product. This ranking may be displayed to an operator, together with additional data such as the financial consequences of processing the orders in that manner. As described above, the orders are preferably determined based on minimising giveaway, although other metrics may be used to determine which order best corresponds to the measured parameter(s), such as deadlines for fulfilling the orders. Preferably, the operator is capable of overriding the ranking if deemed necessary.

Typically, the poultry processing system comprises at least one of cutting apparatus, a batch weigher and a batching table. Once the at least one poultry bird has been allocated to an order by the recommendation system, it is fed, typically on a hanger line, to the poultry processing system where it is cut into the desired portion. The portions are then weighed into the required batches by the batch weigher and packaged at the batching table, typically by manual operators. Preferably the batch weigher is a computer combination weigher (CCW) such as a multihead screw-feed weigher.

The packaged batches are then fed, typically on a conveyor, to be sealed or wrapped, and finalised before being delivered to the desired outlet, such as a supermarket or fast food restaurant. The present invention is suitable for use in single, twin or dual lane tray sealing or wrapping systems.

Once the griller has been cut into the allocated portion, remaining portions of the chicken are then directed towards the relevant weigher and batching table.

In accordance with a second aspect of the present invention there is provided a computer-implemented method for controlling a poultry packaging system, comprising: (a) receiving a plurality of orders for poultry product, wherein said poultry product is either a whole or a portion of a poultry bird; (b) receiving at least one measurable parameter of at least one poultry bird from a measurement unit; (c) determining which of the plurality of received orders best corresponds to the received at least one measurable parameter; and (d) transmitting a signal to a poultry processing system such that said poultry processing system processes the poultry birds in accordance with the order determined in step (c).

In accordance with a third aspect of the present invention there is provided a computer program product comprising instructions which when executed by data processing apparatus causes the apparatus to be configured to be operable in accordance with the second aspect of the invention.

In accordance with a fourth aspect of the invention there is provided a poultry packaging system comprising the apparatus of the first aspect of the invention.

The present invention provides a clear advantage over the prior art in that it immediately reduces the amount of waste and giveaway in a food packaging factory. It also reduces the amount of food product sold as bulk or batches sold "overweight" (for example a "large" chicken being sold as a "medium" chicken), thereby increasing efficiency and reducing waste.

It is also envisaged that the system of the present invention is capable of increasing efficiency in food orders before chickens even arrive at a food processing factory. For example, it will be possible to request certain weight poultry birds to be delivered to the factory at certain times in order to process the orders most effectively.

Alternatively, the invention may allow operators to suggest that the clients (such as supermarkets) change their orders (either in terms of batch weight or portion type and size) if it is known in advance what weight poultry birds will be delivered, and thus what orders would be processed most efficiently.

These advantages are beneficial for each of the poultry bird farmer, food production system and the end consumer.

BRIEF DESCRIPTION OF THE DRAWINGS

Certain preferred embodiments of aspects of the present invention will now be described, by way of example only, with reference to the following drawings, in which.

DETAILED DESCRIPTION OF THE INVENTION

Figure 1:
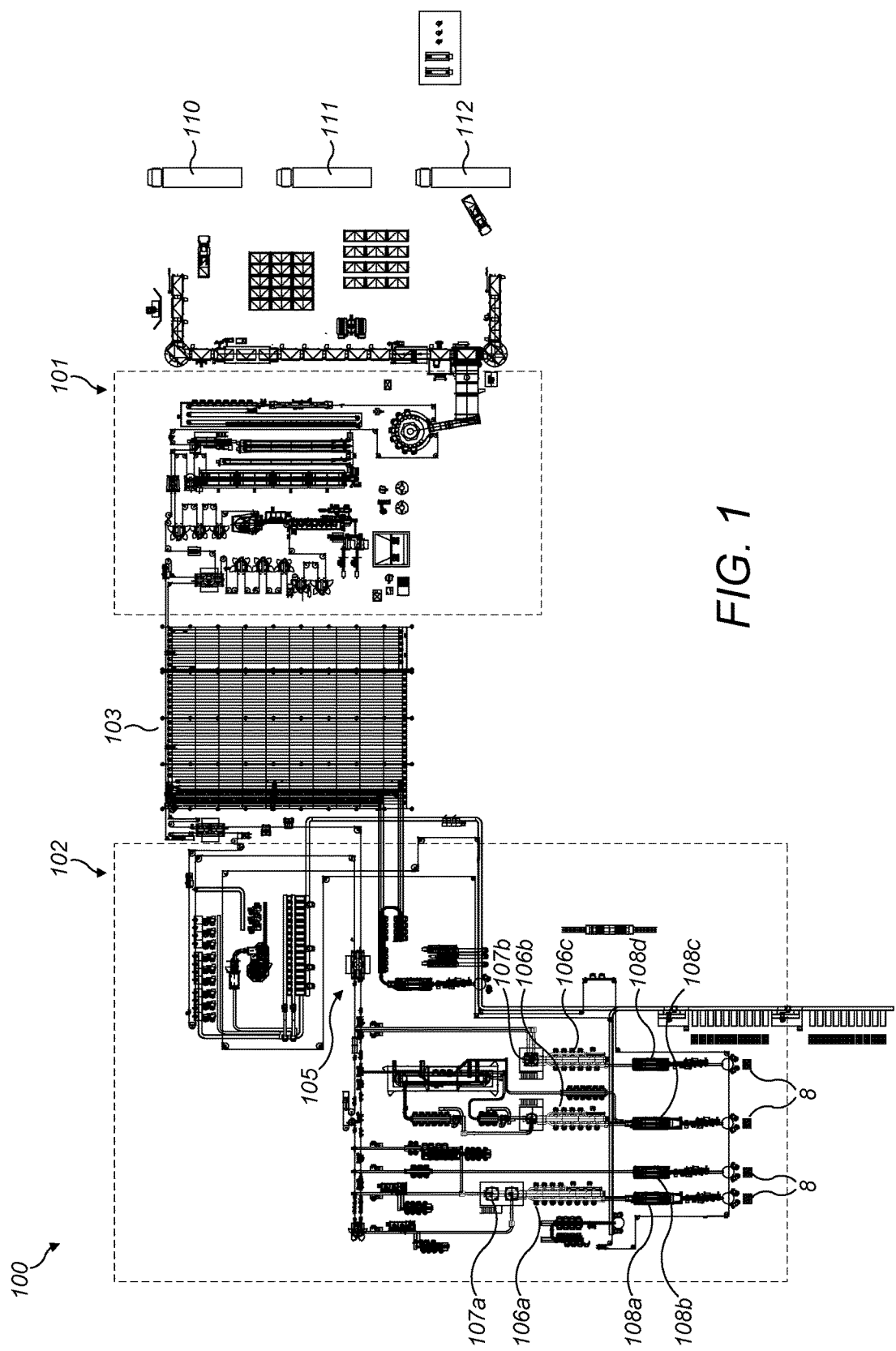
FIG. 1 shows a schematic overview of a poultry factory in one embodiment of the invention.

FIG. 1 is a plan view of a chicken factory 100 comprising a preparation system 101 and processing system 102. Whole chickens are delivered to the preparation system 101 by trucks 110, 111, 112. Preparation system 101 comprises apparatus known in the art to slaughter, de-feather, eviscerate and de-bone the chickens. The chickens are typically transported between the slaughtering, de-feathering and evisceration apparatuses on a continuous moving hanger line, with the chickens typically hung from their feet in shackles. The prepared birds (known as "grillers"), which have been slaughtered, de-feathered and eviscerated, are then weighed and quality inspected and transported along the hanger line to a chiller unit 103. Within the chiller unit 103, the hanger line doubles back on itself a number of times as seen in FIG. 1 such that, although the grillers will be continuously moving along the hanger line through the chiller unit 103, the grillers will typically spend three hours between entering and exiting the chiller unit 103. As will be appreciated, chillers and hanger lines vary in size from factory to factory.

Chicken processing system 102 comprises cutting apparatus (generally shown at 105) operable to cut the prepared grillers, once they have exited the chiller unit 103, into desired portions to be packaged. Such portions include thighs, drums, whole legs, breast and wings amongst others. The desired portions are then weighed in a computer combination weigher (CCW) such as a multihead weigher (shown at 107a and 107b) and arranged in batches by operators or automated robotics on batching tables 106a, 106b, 106c. For example, multihead weigher 107a may weigh out 800 g batches of four chicken thighs to be packaged by operators on batching table 106a.

The multihead weighers typically comprise a plurality of output hoppers and are capable of weighing multiple different target weights simultaneously. For example, a single multihead weigher may simultaneously weigh out 800 g batches and 1000 g batches of chicken thighs in separate output hoppers. This advantageously improves efficiency of the batching process, thereby increasing throughput.

The batches are placed by the operators or automated robotics into containers (typically trays) which are then sealed on packaging or wrapping lines 108. This is typically done in a tray sealer (shown at 108a, 108b, 108c, 108d) which applies a lidding film to the top of the filled container. The sealed containers are then labelled accordingly and distributed to the desired outlet, for example a supermarket or fast-food restaurant. The packaging lines 108 may be "single lane" lines sealing one line of trays at a time, or "dual lane" lines, which are operable to seal two lines of trays simultaneously. Each of the batching tables and packaging lines is typically operable to package different portions of chicken.

Figure 2:
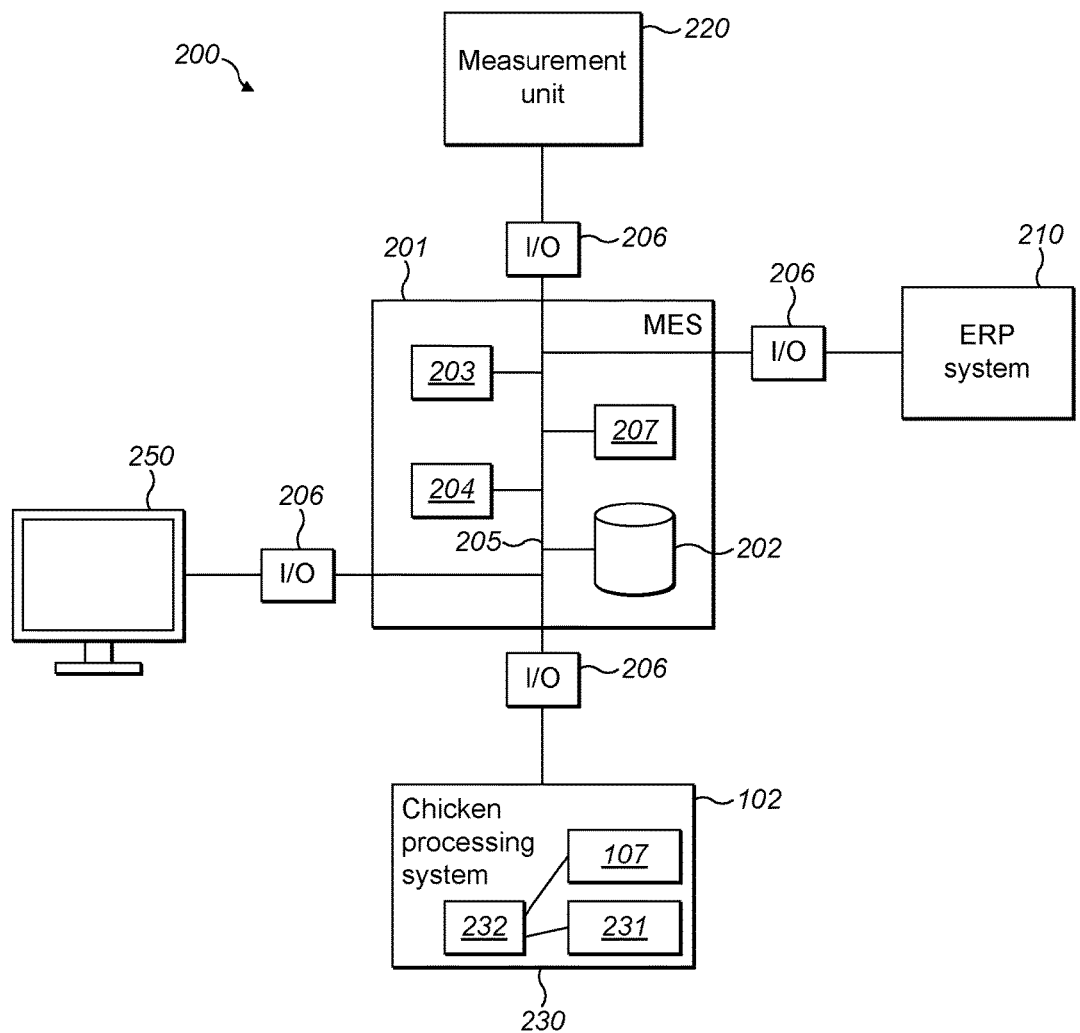
FIG. 2 shows a schematic representation of one embodiment of the invention.

FIG. 2 is a schematic diagram of the system 200 of the present invention. The system 200 comprises a Manufacturing Execution System (MES) 201, in communication with a measurement unit 220, Enterprise Resource Planning (ERP) system 210, Chicken Processing System (CPS) 230 and a monitor 250 via input/output adapters 206 using communication means such as the internet. Alternatively, other communication means may be used, such as a local area network (LAN). The MES 201, ERP 210, measurement unit 220, CPS 230 and monitor 205 may be remote from each other, or may be integrated into a single device. Alternatively, certain units may be remote and others integrated. For example, the monitor 250 and the MES 201 may be a single unit, with the ERP 210, measurement unit 220 and CPS 230 being remote.

The MES 201 further comprises a bus 205 that communicatively connects first determining processor 203, second determining processor 204, recommendation engine 207, memory 202 and the I/O adapters 206.

In use, the ERP 210 is operable to receive orders for chicken portions. This may be, for example, an order from a supermarket for 1000 packs of chicken thighs, wherein each pack contains four thighs and has a total weight of 800 g. The ERP 210 transmits the order data to the MES 201 over the internet, LAN or other communication means. This data is then stored in memory 202 within the MES 201. Memory 202 may be volatile or non-volatile memory. Alternatively, the data can be processed "on the fly" without being stored in memory.

First Embodiment

In a first embodiment of the present invention, measurement unit 220 is operable to receive the weights of each griller from the preparation system 101. In this embodiment, the measurement unit 220 is a weigher. Alternatively, the weigher 220 may receive the weights of the live birds delivered to the factory before slaughter. The measurement unit 220 transmits this data to the MES 201 over the internet or other communication means.

In order to ensure that the weights received at the MES 201 correspond to the correct grillers, each griller is numbered with an electronic tag, together with any other pertinent information such as its quality or whether it is Halal.

Processor 204 then determines the average weight of a chicken portion in an individual griller by utilising the measured weight of the whole griller. It is well known to the skilled person that each portion of a griller (such as breast, thigh, wing etc.) comprises a certain percentage of the overall weight of the griller, and there is little variance in these percentages from bird to bird. For example, two drums typically account for 13.5% to 14.5% of the griller weight; similarly a breast cap makes up 34% to 36% of the overall griller weight. It is therefore straightforward to determine the weights of each portion of an individual griller. Similar known percentages exist using the weights of live birds, since the griller weight is a certain percentage of the live weight.

Figure 3:
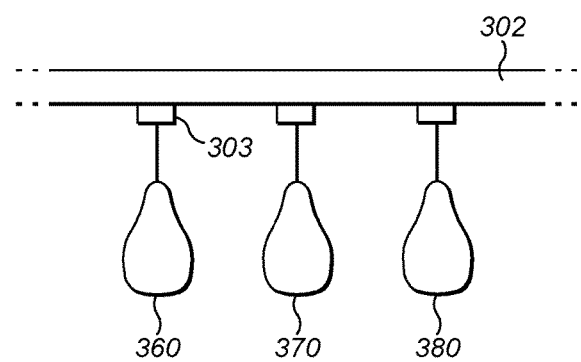
FIG. 3 shows a diagram of individual prepared chickens (or "grillers") on a hanger line according to a first embodiment of the invention.

Each griller is analysed individually and, depending on the orders received by the ERP system 210, recommendation engine 207 determines how each griller will be processed by the chicken processing system accordingly. FIG. 3 shows three individual grillers 360, 370 and 380 hung by shackles 303 on hanger line 302 in the chiller 103. Processor 204 has determined the predicted weights for each portion of each griller, as described above. From this data, recommendation engine 207 matches each griller 360, 370 and 380 to one of the orders received at the ERP system 210. For example, griller 360 may have an ideal drum weight to match an order for packs of chicken drums; griller 370 has a wing weight matching an order for wings within a weight tolerance of +/−5 g, and griller 380 has a weight matching an order for chicken breast.

The recommendation engine 207 ranks the received orders from ERP system 210 in the order in which they should be processed in order to minimise giveaway of food product and increase efficiency. An operator is informed, via a GUI on monitor 250, of this ranking. The operator is also informed of other consequences of processing the orders in the order determined by recommendation engine 207, such as financial consequences of any giveaway produced. The processor 207 is adapted to minimise the amount of overweight product in order to reduce giveaway and increase efficiency; however, the operator is able to override the processor 207 if (s)he deems necessary.

The recommendation engine 207 then transmits a signal(s) to control unit 232 within the CPS 102 such that the desired orders can be processed from the grillers. The MES 201 and control unit 230 are in communication via the internet or other communication means. CPS 102 further comprises cutting apparatus 231 and at least one CCW 107, both of which are in communication with, and controlled by, control unit 232. The cutters 231 are operable to cut the grillers 360, 370 and 380 into the desired portions.

Alternatively, orders may be received at the MES 201 for whole grillers. In such an instance, the weight of the griller itself is taken into account when determining which order it should be used to process.

The received order for which an individual griller may be used is changeable right up to the point where that griller exits the chiller and enters the CPS 102. For example, if griller 360 is originally going to be used for an order of wings, but a subsequently analysed subset would provide a better "fit" to the wings order, then griller 360 will be used to provide portions for a different order.

Within the CPS 102 there are typically a plurality of batching tables 106a, 106b, 106c operating simultaneously, with each batching table being used for a different poultry portion. For instance, the drums from griller 360 are directed to a CCW serving batching table 106a; the wings from griller 370 are sent to a CCW serving batching table 106b and the breast portions from griller 380 are sent to CCW serving batching table 106c. The portions are then packaged accordingly by manual operators of automated robotics. In this embodiment, each CCW is a multihead weigher and is operable to weigh two different portion weights simultaneously. For example, one multihead weigher may be operable to weigh both 400 g and 600 g batches of chicken breast simultaneously. Even so, other types of CCW can be used, such as screw-feed weighers.

Of course, the grillers 360, 370, 380 are cut up into portions other than the recommended portion, and these other portions are directed to the appropriate batching table to make up other orders. For example, the breast from griller 360 is sent to the batching table where batches of chicken breast are being processed. Alternatively, the other portions may be directed to "bulk" if their weights do not match any current orders. "Bulk" in this context is unpackaged chicken product that may be sold off cheaply to minimise wastage. Sometimes a certain percentage of bulk may be required for further processing of, for example, frozen product. This is usually sold at a reduced price.

The packed containers are then sealed with the correct size tray sealer on a packaging line 8, labelled, finalised and distributed as desired. Different chicken portions will require differing sizes of tray (for example drums require larger trays than wings), and so the correct packaging line and tray sealer is chosen accordingly to accommodate the correct size trays.

Figure 4:
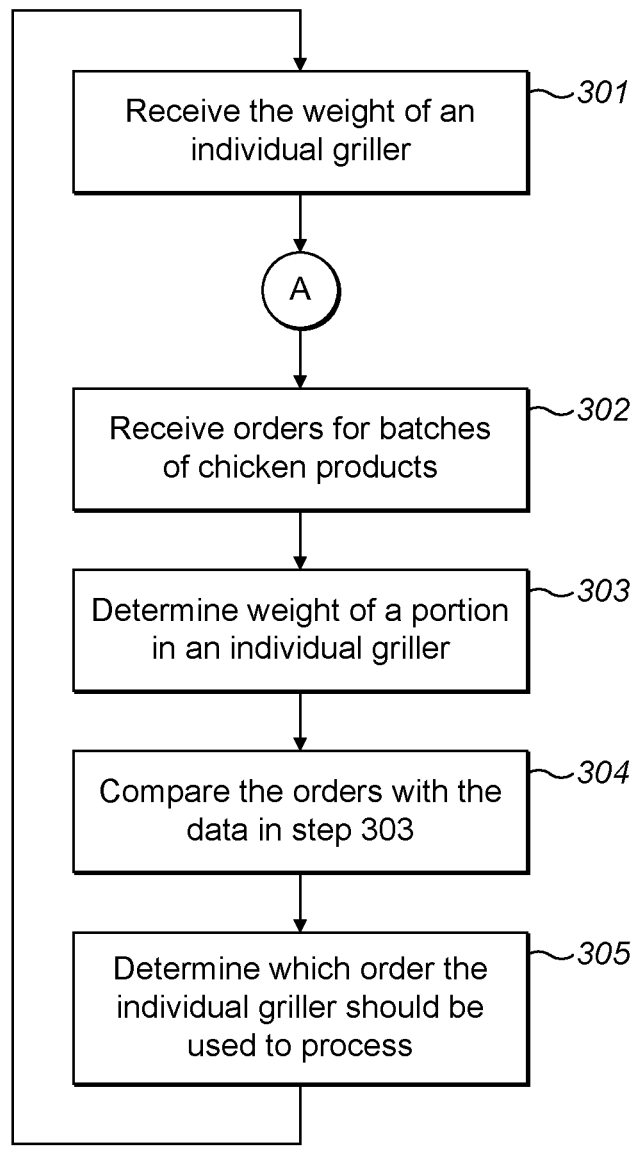
FIG. 4 is a flow chart outlining the steps of a first embodiment of the invention.

FIG. 4 is a flowchart outlining the steps of the first embodiment of the invention. In step 301 the weight of an individual griller is received at the MES 201 from the weigher unit 220. At step 302, the MES receives orders for batches of chicken products from the ERP system 220. The skilled person will appreciate that steps 301 and 302 may be performed in that order, in the reverse order (i.e. the orders received before the weights), or simultaneously.

As described above in relation to FIG. 2, in step 303 the processor 204 determines the weight of a portion of the individual griller from the well-known look-up values.

In step 304, processor 207 compares the received orders from step 302 with the determined portion weights from step 303.

Finally, at step 305, the MES 201 determines which order the griller should be used to process. For example, if the griller has an ideal weight to match an order for chicken drums, the griller will be processed by CPS 102 and cut into drums. The flowchart then loops back to step 301 where the weight of the next griller is received at the MES.

Second Embodiment

In a second embodiment of the present invention, the grillers in the chiller are not allocated to the orders received at ERP system 210 on an individual basis, but rather on a "subset" basis. This is particularly advantageous when the factory is handling a large volume of poultry birds in a short period of time, or where the orders allow for some variance in the weights of individual portions (i.e. large tolerances). For example, each chicken thigh in a 1000 g batch of chicken thighs can have a slightly different weight as long as the total weight of all four thighs is 1000 g.

Figure 5:
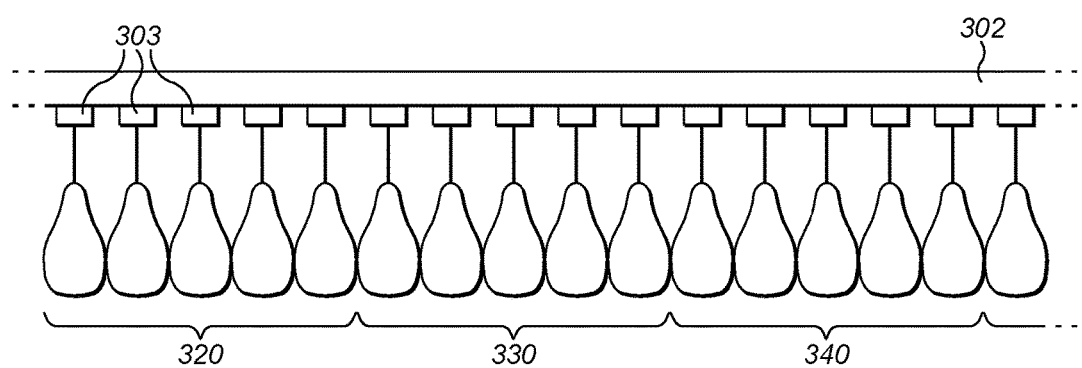
FIG. 5 shows a diagram of subsets of individual prepared chickens (or "grillers") on a hanger line according to a second embodiment of the invention.

In the same manner as the first embodiment, measurement unit 220 is a weigher unit and weighs each individual griller (or alternatively live bird). The grillers are then split into subsets, as schematically seen in FIG. 5 which shows subsets 320, 330 and 340 of grillers hung by shackles 303 on hanger line 302. The first subset 320 of grillers may be determined as the number of grillers that enter the chiller unit 103 in a set period of time, for example 30 minutes, or as a set number of grillers, for example 100. The second subset of grillers 330 is then determined in a similar manner. Subsets may comprise the same number of grillers, although it is envisaged that different subsets may have different numbers of grillers. In the example shown in FIG. 5, the number of grillers in each subset is constant. The size of the subset may be set by a user using a graphical user interface (GUI) displayed on monitor 250, or may be predetermined.

In order to ensure that the weights received at the MES 201 correspond to the correct grillers, each griller is numbered with an electronic tag, together with information such as its quality. The grillers in each subset are consecutive and adjacent each other on the hanger line.

Processor 203 then determines the average weight of the grillers in a subset. The "average" is typically the mean value, although other averages may be used, such as median or mode. The size and weights of the grillers in a subset will vary; however in the present invention the average weight is of more importance than the variance.

Processor 204 then determines the average weight of a chicken portion in the subset by utilising the average weight of a griller in that subset determined by processor 203. It is well known to the skilled person that each portion of a griller (such as breast, thigh, wing etc.) comprises a certain percentage of the overall weight of the griller. There is little variance in these percentages from bird to bird. For example, two drums typically account for 13.5% to 14.5% of the griller weight; similarly a breast cap makes up 34% to 36% of the overall griller weight. It is therefore straightforward to determine the average weight of each portion of a griller in that subset. Similarly to processor 203, the "average" is typically the mean; however other average values may be determined such as modal and median values.

As an alternative, it is also possible to break down the weight of a whole chicken (as opposed to a prepared griller) into portion weights by percentage, where the whole birds have been weighed before being processed in preparation system 101.

The received weight data from weigher unit 220, as well as the determined average griller and portion weights may be stored in memory 202, or processed "on the fly". Typically, the griller or live bird weights received from weigher unit 220 relating to the second, third, fourth subsets etc. will be stored in memory 202 until they can be processed by processors 203, 204 at the desired time (i.e. once the data relating to the first subset has been processed).

Recommendation engine 207 then compares the average portion weights from processor 204 with the plurality of orders stored in memory 202 in order to determine which portions of the grillers will be processed and packaged next. The manner is which the comparison is carried out is explained by means of an example below.

In more detail, an order A may be for 500 g portions of chicken thighs made up of four individual pieces, and an order B may be for 1000 g portions of chicken legs made up of four individual pieces. Conventionally however, the data about the chickens is not taken into account when processing the orders. For example, the chickens in subset 320 may have had an average thigh weight of 175 g, making them difficult to portion into packs of four weighing 500 g. Using the chickens in subset 320 to process order A would generate a lot of giveaway or product sold as bulk, reducing efficiency.

However, the chickens in subset 320 may have an average leg weight of 250 g, making them ideal for producing batches of four whole legs making up a weight of 1000 g. In the present invention, recommendation engine 207 would recognise this, and the subset 320 would be used to process order B rather than order A in order to minimise waste and giveaway. order A could then be processed from subset 330, which may have a more optimal average weight of chicken thighs.

Alternatively, orders may be received at the MES 201 for whole grillers. In such an instance, the average weight of birds in a subset as determined by processor 203 is taken into account when determining which order to process next.

The recommendation engine 207 ranks the received orders from ERP system 210 in the order in which they should be processed in order to minimise wastage or giveaway of food product and increase efficiency. An operator is informed, via a GUI on monitor 250, of this ranking. Due to natural variations in chicken weights, it is unlikely that the subsets will fulfil the order weights exactly, and therefore in a preferred embodiment, the GUI displays the amount of overweight product a subset will generate when matched to a particular order, together with the financial consequence of this wastage. The processor 207 is adapted to minimise the amount of overweight product in order to reduce wastage and increase efficiency; however, the operator is able to override the processor 207 if (s)he deems necessary.

The received order for which a subset may be used is changeable right up to the point where that subset exits the chiller and enters the CPS 102. For example, if subset 320 is originally going to be used for an order of wings, but a subsequently analysed subset would provide a better "fit" to the wings order, then subset 320 will be changed to provide portions for a different order.

The processor 207 then transmits signal(s) to a control unit 232 in chicken processing system 102 such that the desired orders can be processed from the grillers. The MES 201 and control unit 232 are in communication via the internet or other communication means. Chicken processing system 102 further comprises cutting apparatus 231 and at least one CCW 107, both of which are in communication with, and controlled by, the control unit 232. As described hereinabove, the grillers are hung in single file on movable hanger 302, and so subset 320 will be processed first once the grillers exit the chiller. This subset 320 may have been determined to have the correct weight wings to fulfil an order for 500 g packs of chicken wings. The cutters 231 are thus controlled by control unit 232 to cut the grillers in subset 230 into wing portions.

The control unit 232 is then operable to control the CCW 107 to weigh out the wings into the desired weight batches (within a predetermined tolerance) and packed into containers on one of batching tables 106a, 106b, 106c.

The packed containers are then sealed with the correct size tray sealer on a packaging line 8, labelled, finalised and distributed as desired. Different chicken portions may require differing sizes of tray (for example drums require larger trays than wings), and so the correct packaging line and tray sealer is chosen accordingly to accommodate the correct size trays.

The grillers in first subset 320 may also be cut into portions other than wings (such as drums or breast for example) and these may be used to process an order for such portions.

The next subset to be processed by chicken processing system 102 is the second subset 330, and the grillers will be cut and weighed in accordance with the order that best matches the average weights of that subset.

Figure 6:
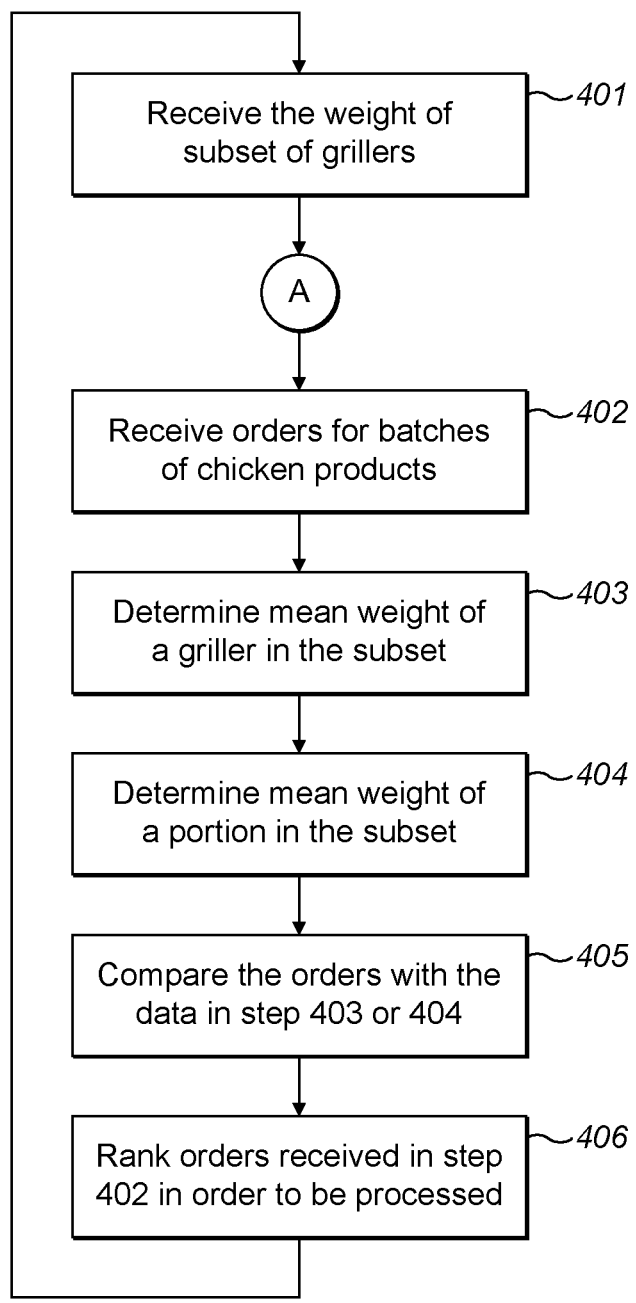
FIG. 6 is a flow chart outlining the steps of a second embodiment of the invention.

FIG. 6 is a flowchart outlining the steps of the second embodiment of the invention. In step 401 the individual weights of each griller in a subset are received at the MES 201 from the weigher unit 220. The subsets are determined as described hereinabove. At step 402, the MES receives orders for batches of chicken products from the ERP system 220. The skilled person will appreciate that steps 401 and 402 may be performed in that order, in the reverse order (i.e. the orders received before the weights), or simultaneously.

As described above in relation to FIG. 2, the processor 203 determines the mean weight of a griller in the subset at step 403, and at step 404 a mean weight of each chicken portion is determined for that subset. Although in this embodiment the mean is used, other average values such as the mode or median may be used.

In step 405, processor 207 compares the received orders from step 402 with the determined mean weights from steps 403 or 404. Each order is individually compared with the weight data of the current subset being analysed. Specifically, if the order is for a particular portion (such as a wing or drum), it is compared to the weight determined in step 404. On the other hand, if the order is for a whole chicken, the order is compared to the mean weight determined in step 403. For example, an order might be for "large" chickens in a certain weight range, and processor 207 determines whether the mean weight of the subset seen in step 403 is in that range.

Finally, at step 406, the orders received in step 402 are ranked in order (with the order that would produce the least wastage from that subset ranked as most preferable) for that particular subset of grillers (other metrics are taken into account when ranking the orders however, such as the delivery deadline). The flowchart then loops back to step 401 where the weights of the next subset are received at the MES. It should be noted that since the chickens are in the chiller 103 for up to three hours, there will be many subsets in the chiller that have been compared to the orders on the MES 201 and that have not been processed by the processing system 102. Therefore, present invention is capable of analysing the orders against a number of subsets. For example, if the top-ranked order for subset 320 is wings, and the top-ranked order for subset 340 is also wings but with less wastage than for subset 320, the processing system 103 will process the wing order with subset 340. As described hereinabove, the order for which a subset will be used to fulfil is changeable right up until that subset exits the chiller.

Third Embodiment

In a third embodiment of the present invention the measurement unit 220 is further operable to determine the quality of each griller before it reaches the chicken processing system 102. In this context, "quality" refers to attributes of each griller such the number of bloodspots on the griller or if there are any physical abnormalities. This can be determined by manual workers or automatically. If a griller is determined to have a quality higher than a certain threshold, then it will be packaged as a whole griller without being cut into portions in the CPS 102. The weight of the grillers will still be measured at the measurement unit 220, and any grillers having a quality greater than a predetermined threshold will then be package by weight, for example as a "small" chicken, a "medium" chicken or a "large" chicken. Alternatively, if the weight of the griller is not in an appropriate range for packaging in such a manner, it will be cut up into portions by the CPS 102.

Figure 7:
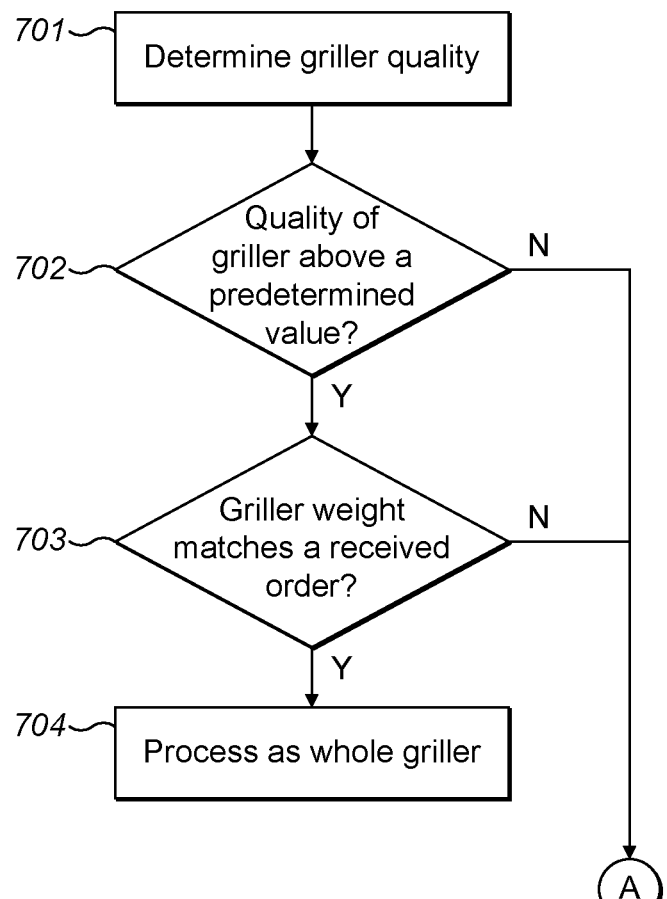
FIG. 7 is a flow chart outlining the steps of a third embodiment of the invention.

This procedure is illustrated in FIG. 7. At step 701 the griller quality is determined. This can be carried at any time before the griller reaches the CPS 102. The quality is typically determined by a manual operator who checks each griller for any blood spots, deformities or other features that would detract from the presentation of the griller to an end consumer. Alternatively, the quality check may be carried out automatically, for example an infra-red inspection may be used to determine the number of blood spots present.

In a further embodiment, the measurement unit is operable to determine whether the chickens have been slaughtered in accordance with halal, and if so those grillers can be processed separately.

At step 702, if the quality of the griller is above a predetermined threshold, then the flowchart moves to step 703 where the griller's weight as measured at measurement unit 220 is compared to the orders received at ERP system 210. The threshold may be a certain number of bloodspots for example. A griller having a fewer bloodspots than the threshold will move to step 703 in FIG. 7 flowchart.

At step 703, processor 207 determines whether the weight of the griller matches any of the orders in the ERP system 210. If so, then the griller is packaged as a whole griller (step 704) and sized depending on its weight (for example "small", "medium" or "large"). This "check weight" step 703 prevents whole grillers from being sold at the wrong weight, thereby reducing giveaway and improving consumer safety. For example, if a large chicken is packaged as a "medium" chicken, then the end consumer is likely to not cook the chicken for long enough.

As seen in FIG. 7, if at either of the decision steps 702, 703 the answer is "no", then the flowchart proceeds to point A of either FIG. 4 or FIG. 6, depending on whether the food packaging system is operating on a "subset" basis or an individual griller basis. The features of the third embodiment can be incorporated into the first and second embodiments individually. For example, in one embodiment, the grillers are analysed on an individual basis depending on their weight and quality, and in another embodiment, the grillers are analysed based on a subset basis depending on their weight and quality.

The features of any of the above-described embodiments can be used in any of the other embodiments. For example, the "individual" nature of the first embodiment may be used in the second embodiment to further increase efficiency. For instance, different orders received at the ERP system 210 may require different tolerances. For example, an order for chicken wings from a fast food restaurant may require each chicken wing to be of a particular weight with a tolerance of +/−5 g. On the other hand, an order from a large supermarket for packs of four chicken thighs totalling 500 g does not require such accurate tolerances for each individual thigh as long as the total weight is 500 g. Therefore, the system 200 may run in the "subset" mode for filling the orders with a lower tolerance, but if an individual griller has a correct weight chicken wing to meet a small tolerance such as +/−5 g, then that individual griller can be used to process the wing order.

The present invention advantageously provides flexibility in how the grillers are processed. The processor 207 analyses the orders received at ERP system 210 and is operable to determine whether the grillers should be processed by the CPS 102 on a "subset" basis which increases throughput, or an individual basis, which allows greater control of portion weight and quality.

Further, the use of measurement unit 220 to determine the quality of the grillers can be used in either the first or second embodiments.

The present invention provides a clear advantage over the prior art in that it immediately reduces the amount of waste in a food packaging factory. It also reduces the amount of food product sold as bulk or batches sold "overweight" (for example a "large" chicken being sold as a "medium" chicken), thereby increasing efficiency and reducing waste.

It is also envisaged that the system of the present invention is capable of increasing efficiency in food orders before chickens even arrive at a factory. For example, if a number of orders are stored in the memory 202, it will be possible to request certain weight chickens to be delivered to the factory at certain times in order to process the orders most effectively. As explained earlier, portion weights can be determined accurately from the weight of a whole bird (rather than a just from a griller), and so the weights of chickens being delivered by trucks 110, 111 and 112 can be requested.

Alternatively, the invention may allow operators to suggest that the clients (such as supermarkets) change their orders (either in terms of batch weight or portion type and size) if it is known in advance what weight chickens will be delivered, and thus what orders would be processed most efficiently.

Although the above description relates predominantly to a chicken factory, the present invention is also suitable for other food packaging systems such as beef, lamb and pork processing systems.

The invention claimed is:

1. Apparatus for controlling a poultry packaging system, comprising:
    a first receiving unit operable to receive a plurality of orders for poultry product, wherein said poultry product is a portion of a poultry bird, and wherein characteristics of each received order include the weight of the received order and the number of individual poultry bird portions making up the weight of the received order;
    a second receiving unit operable to receive at least one measurable parameter of at least one poultry bird from a measurement unit wherein the at least one measurable parameter comprises the weight of the at least one poultry bird, and the second receiving unit is further operable to determine the weight of a portion of the at least one poultry bird utilizing the received weight of the poultry bird;
    a recommendation unit operable to determine which of the plurality of received orders best corresponds to the received at least one measurable parameter based on the characteristics of each received order and the at least one measurable parameter of the at least one poultry bird, and;
    a control unit operable to transmit a signal to a poultry processing system such that said poultry processing system processes the at least one poultry bird in accordance with the determined order.

2. The apparatus of claim 1, wherein the at least one measurable parameter is from the group including the weight of the poultry bird and the quality of the poultry bird.

3. The apparatus of claim 1, wherein the at least one measurable parameter comprises the quality of the at least one poultry bird, and the recommendation unit is further operable to determine, based on the measured quality of the poultry bird, whether the poultry bird should be processed in accordance with an order for a whole poultry bird or an order for a portion of a poultry bird.

4. The apparatus of claim 1, wherein the second receiving unit is operable to receive the weights of a plurality of poultry birds, and is further operable to:
    (i) determine an average weight of a poultry bird in a subset of the plurality of poultry birds; and
    (ii) determine an average weight of a poultry portion in said subset utilising the determined average poultry bird weight of said subset of the plurality of poultry birds;
    and further wherein the recommendation unit is operable to determine which of the plurality of orders best corresponds to the average weights in steps (i) or (ii).

5. The apparatus of claim 1, wherein the recommendation unit is further operable to rank the plurality of received orders in an order to be processed so as to minimize giveaway of poultry bird product.

6. The apparatus of claim 1, wherein the measurement unit is a weigher.

7. The apparatus of claim 1, wherein the poultry processing system comprises at least one of cutting apparatus, a batch weigher and a batching table.

8. The apparatus of claim 7, wherein the batch weigher is a computer combination weigher (CCW).

9. A computer-implemented method for controlling a poultry packaging system, comprising:
    (a) receiving a plurality of orders for poultry product, wherein said poultry product is a portion of a poultry bird, and wherein characteristics of each received order include the weight of the received order and the number of individual poultry bird portions making up the weight of the received order;
    (b) receiving at least one measurable parameter of at least one poultry bird from a measurement unit wherein the at least one measurable parameter comprises the weight of the at least one poultry bird; and
    determining the weight of a portion of the at least one poultry bird utilising the received weight of the poultry bird;
    (c) determining which of the plurality of received orders best corresponds to the received at least one measurable parameter based on the characteristics of each received order and the at least one measurable parameter of the at least one poultry bird; and
    (d) transmitting a signal to a poultry processing system such that said poultry processing system processes the poultry birds in accordance with the order determined in step (c).

10. The computer-implemented method of claim 9, further comprising the step of determining the weight of a portion of the at least one poultry bird utilising the received weight of the poultry bird.

11. The computer-implemented method of claim 9, wherein step (b) comprises receiving the weights of each of a plurality of poultry birds from a measurement unit, the method further comprising the steps of:
    (i) determining the average weight of a poultry bird in a subset of the plurality of poultry birds; and
    (ii) determining the average weight of a poultry portion in said subset utilising the determined average poultry bird weight of said subset of the plurality of poultry birds;
    and wherein step (c) comprises determining which of the plurality of orders best corresponds to the average weights in steps (i) and (ii).

12. The computer-implemented method of claim 9, wherein the step of determining which of the plurality of received orders best corresponds to the at least one measurable parameter is based on characteristics of each received order and the at least one measurable parameter of the at least one poultry bird.

13. The computer-implemented method of claim 9, further comprising ranking the plurality of received orders in an order to be processed dependent on the characteristics of each received order and the at least one measurable parameter of the at least one poultry bird.

14. A computer program product comprising instructions which when executed by data processing apparatus causes the apparatus to be configured to be operable in accordance with the method of claim 9.

* * * * *